United States Patent
Hodges et al.

(10) Patent No.: US 7,243,147 B2
(45) Date of Patent: Jul. 10, 2007

(54) SYSTEMS AND METHODS FOR THE DETECTION AND MANAGEMENT OF NETWORK ASSETS

(75) Inventors: Donna K. Hodges, Cumming, GA (US); Robert E. Wright, Marietta, GA (US); Guy R. Hagan, Snellville, GA (US); James Michael Lockhart, Birmingham, AL (US)

(73) Assignee: BellSouth IP Corporation, Wilmington, DE (US)

( * ) Notice: Subject to any disclaimer, the term of this patent is extended or adjusted under 35 U.S.C. 154(b) by 667 days.

(21) Appl. No.: 10/334,224

(22) Filed: Dec. 30, 2002

(65) Prior Publication Data

US 2004/0128374 A1 Jul. 1, 2004

(51) Int. Cl.
*G06F 15/173* (2006.01)

(52) U.S. Cl. ............ 709/224; 709/221; 709/225; 709/229; 709/250; 726/23; 726/28; 726/29

(58) Field of Classification Search ........ 709/220–225, 709/229, 250; 726/22–23, 28, 29; 705/59
See application file for complete search history.

(56) References Cited

U.S. PATENT DOCUMENTS

| | | | | |
|---|---|---|---|---|
| 6,032,175 | A * | 2/2000 | Fletcher et al. | 709/200 |
| 6,356,949 | B1 * | 3/2002 | Katsandres et al. | 709/238 |
| 6,686,838 | B1 * | 2/2004 | Rezvani et al. | 709/224 |
| 6,715,084 | B2 * | 3/2004 | Aaron et al. | 726/23 |
| 6,735,768 | B1 * | 5/2004 | Tanaka | 717/174 |
| 6,874,028 | B1 * | 3/2005 | Feinleib et al. | 709/227 |
| 2002/0112185 | A1 * | 8/2002 | Hodges | 713/201 |
| 2002/0129264 | A1 * | 9/2002 | Rowland et al. | 713/200 |
| 2003/0126241 | A1 * | 7/2003 | Nagura et al. | 709/221 |
| 2003/0149887 | A1 * | 8/2003 | Yadav | 713/200 |
| 2003/0163708 | A1 * | 8/2003 | Tang | 713/185 |
| 2003/0172124 | A1 * | 9/2003 | Feinleib et al. | 709/217 |
| 2003/0200297 | A1 * | 10/2003 | Wiener | 709/223 |
| 2004/0039813 | A1 * | 2/2004 | Clark et al. | 709/224 |
| 2004/0039916 | A1 * | 2/2004 | Aldis et al. | 713/177 |
| 2004/0098606 | A1 * | 5/2004 | Tan et al. | 713/200 |
| 2004/0098623 | A1 * | 5/2004 | Scheidell | 713/201 |
| 2004/0254863 | A1 * | 12/2004 | Jones et al. | 705/29 |

FOREIGN PATENT DOCUMENTS

| | | | | |
|---|---|---|---|---|
| JP | 2003140971 | A | * | 5/2003 |
| JP | 2004038305 | A | * | 2/2004 |
| JP | 2004046742 | A | * | 2/2004 |

* cited by examiner

*Primary Examiner*—Oanh Duong
(74) *Attorney, Agent, or Firm*—Lee & Hayes, PLLC

(57) ABSTRACT

System and methods are disclosed that enable the detection and management of network assets. Such systems in accordance with the present invention include one or more asset detection systems and one or more asset repositories. Asset detection systems and asset repositories in accordance with the present invention each have an interface for exchanging information. For example, such an interface may enable asset registration information to be detected at an asset detection system and automatically sent to asset repository. Furthermore, for example, such an interface may enable asset registration information to be verified at an asset repository, and enable a verification to be sent to an asset detection system.

20 Claims, 6 Drawing Sheets

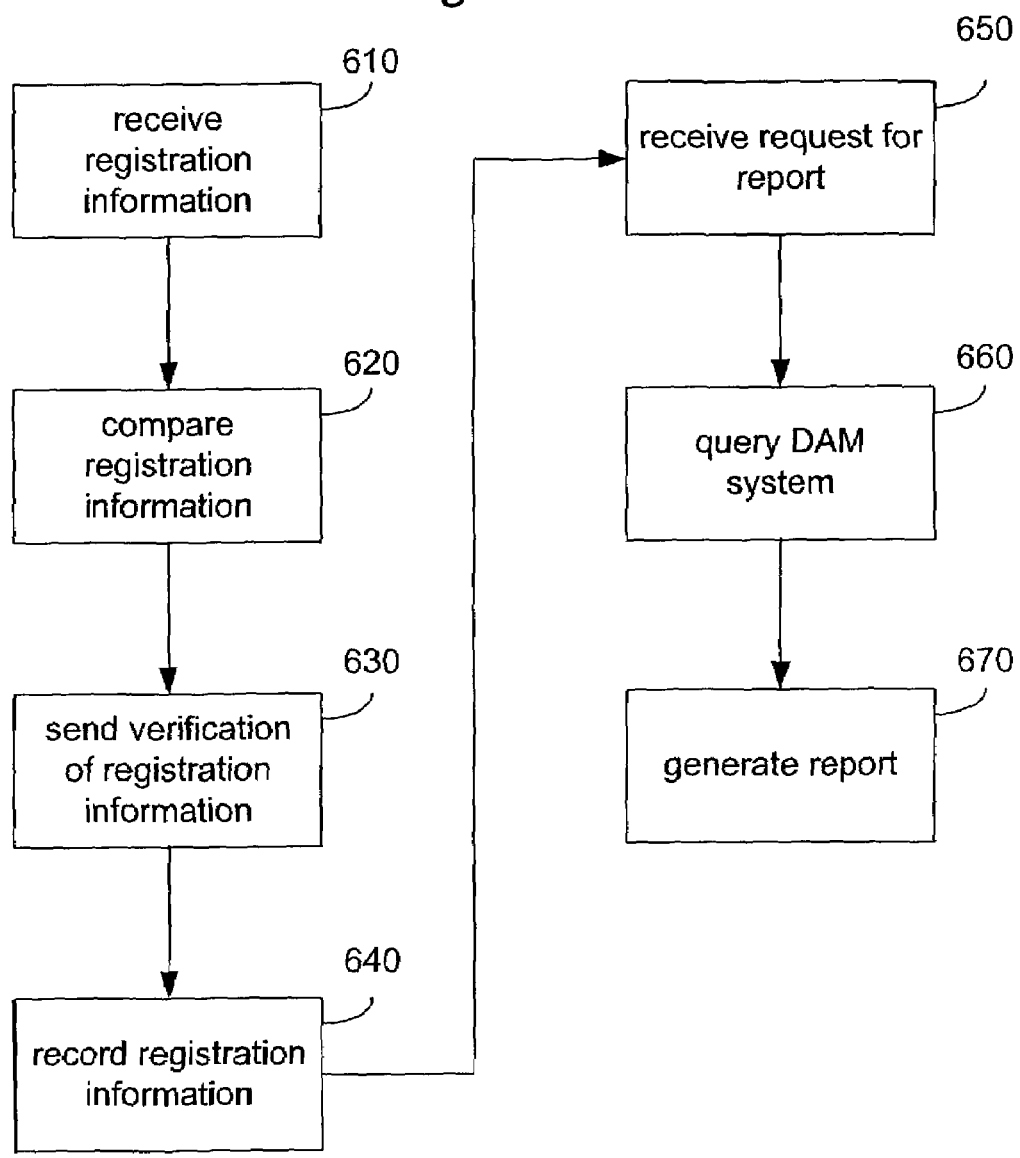

SYSTEMS AND METHODS FOR THE DETECTION AND MANAGEMENT OF NETWORK ASSETS

FIELD OF THE INVENTION

The present invention relates to management of network assets. More specifically, the invention relates to interfacing asset detection systems and asset repositories.

BACKGROUND OF THE INVENTION

To effectively operate and maintain a network infrastructure, network assets must be efficiently detected and managed. A network asset, as that term is used herein, refers to any resource that can be used on a network. Such a network asset may be a "hard" asset such as, for example, a personal computer or a printer, or a "soft" asset such as, for example, a software application.

In conventional systems for detecting and managing network assets, multiple independent systems are employed to acquire and store various information related to network assets. Such independent systems may include "asset detection systems" and "asset repositories." An asset detection system, as that term is used herein, refers to a system that automatically detects and registers assets. An asset repository, as that term is used herein, refers to a system in which assets are manually registered and recorded.

An exemplary conventional system for detecting and managing network assets is shown in FIG. 1. As shown, asset detection and monitoring system 100 includes multiple independent systems 120–150 connected to network 110. Multiple independent systems 120–150 include network and system monitoring tools 120, intrusion detection tools 130, digital asset management (DAM) system 140, and grid information service (GIS) 150. Network and system monitoring tools 120 and intrusion detection tools 130 are example of asset detection systems. DAM 140 and GIS 150 are examples of asset repositories.

Network and system monitoring tools 120 are typically employed to monitor a network and/or system for the appearance of new assets. Upon detection of a new asset, network and system monitoring tools 120 automatically register the asset by acquiring registration information from the asset. For a hard asset, such registration information generally includes information such as a number of central processing units (CPU's) operating at the asset or an amount of memory available at the asset. For a soft asset, such registration information generally includes information such as licensing information and information about the device on which the soft asset can be deployed. Such information about the device on which the soft asset is deployed may be acquired by examining a digital signature that is correlated with a digital certificate issued to the corresponding soft asset. Network "sniffers" may be employed to detect such digital signatures and acquire network information to determine the actual deployed location of a soft asset. A unique identifier such as, for example, an integer or a string may also be assigned to the asset.

Intrusion detection tools 130 are typically employed to detect assets and monitor such assets for an intrusion or security breach. Like network and system monitoring tools 120, intrusion detection tools 130 monitor a network and/or system for new assets, and automatically register such new assets. Intrusion detection tools 130 also monitor detected assets for an intrusion or security breach. If an intrusion or breach is detected, detection tool 130 may generate an alert including an identification of the breached asset. A network or system administrator may then suspend current applications of the breached asset and prevent the breached asset from executing new applications.

DAM system 140 is typically employed as a centralized repository for digital files that enables digital content to be archived, searched and retrieved. Digital content may be stored in databases, which are examples of "asset repositories." Metadata corresponding to the digital content such as photo captions, article key words, advertiser names, contact names, file names or low-resolution thumbnail images is stored in separate databases, that may be referred to as "media catalogs." Such media catalogs refer to items in the asset repositories. Assets are manually registered in the DAM system.

GIS 150 is also typically employed as a centralized repository for assets on a grid. A grid is a collection of distributed computing infrastructure resources, such as, for example, processors, memory, storage, and services that are available over a local area network (LAN) or wide area network (WAN). GIS 150 provides information such as, for example, the availability, location, functionality and capacity of such resources, so that such resources appear to an end user or application as one large virtual computing system. GIS 150 may be used to monitor assets on the grid and to produce reports relating to selected assets.

Such independent systems 120–150 perform several identical operations. For example, both network and system monitoring tools 120 and intrusion detection tools 130 serve as asset detection systems, and both DAM 140 and GIS 150 serve as asset repositories. However, conventional asset detection and management systems do not include an interface for exchanging identical information among independent component systems 120–150. Such an interface would offer several advantages. For example, such an interface would eliminate the duplicative acquisition of identical registration information by asset detection systems 120–130. Furthermore, such an interface would enable registration information to be automatically acquired by an asset detection system 120–130 and electronically reported to an asset repository 140–150. Thus, registration information would no longer need to be manually entered into asset repositories 140–150.

In addition to electronically reporting registration information, such an interface could be used to electronically verify registration information. Specifically, asset detection systems 120–130 could compare acquired registration information with registration information stored in asset repositories 140–150, and, if inconsistencies are detected, an error message could be generated. Such verification of registration information would be particularly advantageous for asset repositories 140–150 that require registration information to be manually entered and are thus susceptible to human errors.

Furthermore, such an interface could be used to enable independent systems to query one another. For example, GIS 150 could query the DAM 140 to obtain information regarding digital licenses. Thus, there is a need in the art for such an interface between multiple independent systems 120–150.

SUMMARY OF THE INVENTION

Systems for detection and management of network assets in accordance with the present invention may include an asset detection system and an asset repository. Each such asset detection system and asset repository includes an interface for exchanging information.

The asset detection system monitors a network for a network asset. Once the asset is detected, the asset detection system acquires registration information associated with the detected asset. Once acquired, the registration information may be sent to the asset repository. Such automatic acquisition and transfer of asset registration information by the asset detection system enables assets to be automatically rather than manually registered at the asset repository.

Once the asset registration information is received at the asset repository, the registration information may be verified against previously received registration information for the asset. The asset repository may send a verification of the asset registration information to the asset detection system. Such a verification may be, for example, a message that registration information for the asset has not been previously sent to the asset repository. Such a verification may also be, for example, a confirmation message that the asset registration information matches registration information for the asset that has been previously sent to the asset repository. Such a verification may also be, for example, an error message that the asset registration information does not match registration information for the asset that has been previously sent to the asset repository. Such an error message may identify the particular portions of the asset registration information that do not match the previously received asset registration information. If such an error message is sent, the asset detection system may generate an alert that prompts a user or system administrator to confirm that the registration information for the asset has changed or to correct the new registration information.

Verified registration information may be recorded at the asset repository, and the data stored at asset repositories may be queried to generate a report.

The asset detection system may detect a security breach or intrusion at an asset by generating a security alert to a user, a system administrator, or to the asset repository. Such a security alert may identify the breached asset. Upon receiving such a security alert, the user, system administrator, or the asset repository may suspend current applications at the breached asset and prevent the breached asset from executing new applications.

BRIEF DESCRIPTION OF THE DRAWINGS

The illustrative embodiments will be better understood after reading the following detailed description with reference to the appended drawings, in which:

FIG. 6 is a flowchart of an exemplary method for verifying asset registration information at a GIS in accordance with the present invention.

DETAILED DESCRIPTION OF PREFERRED EMBODIMENTS

Figure 1:
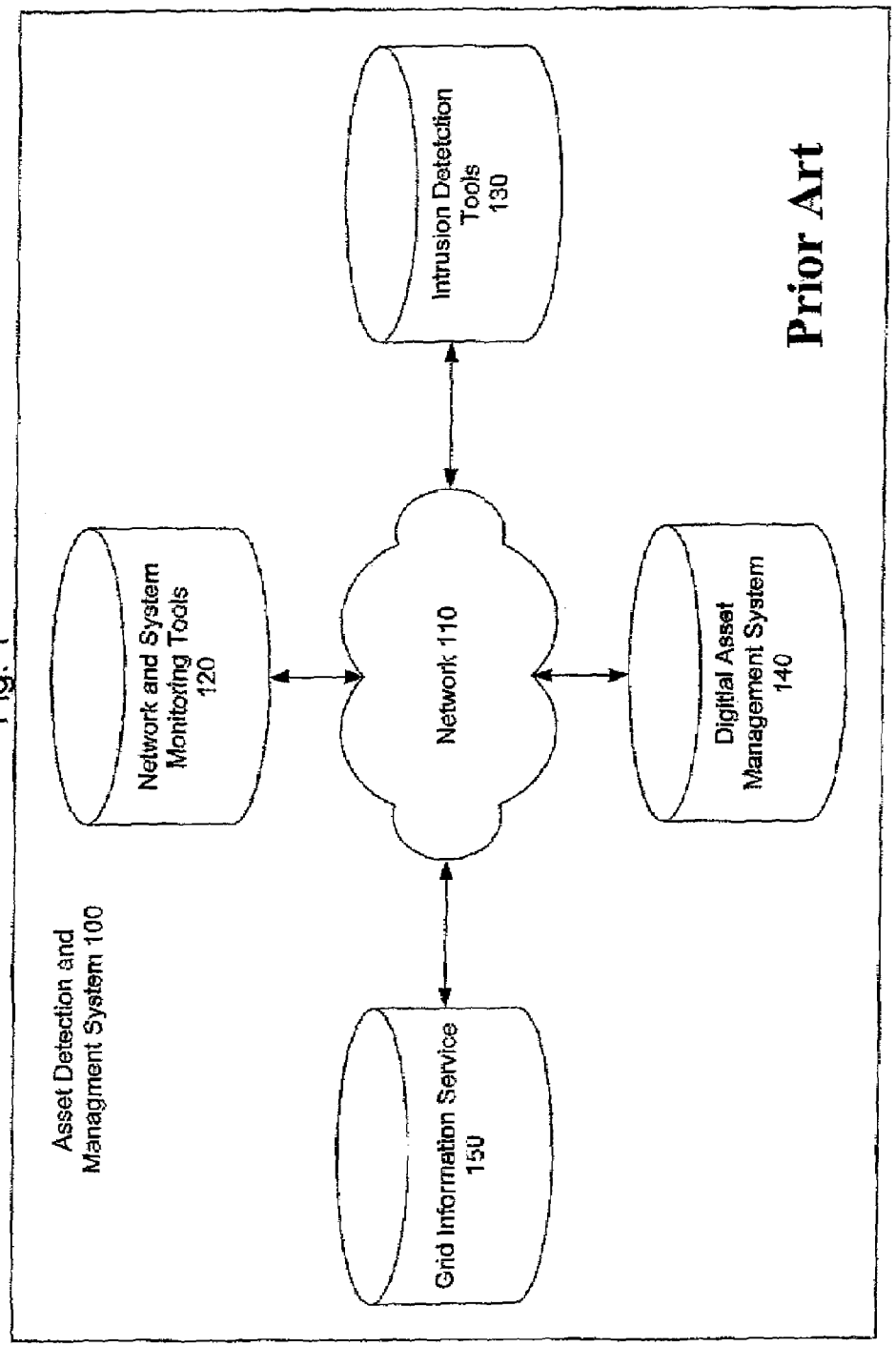
FIG. 1 is a block diagram of a conventional system for asset detection and management.

Presently preferred exemplary embodiments of the invention are described below with reference to the aforementioned figures. Those skilled in the art will readily appreciate that the description given herein with respect to those figures is for explanatory purposes only and is not intended in any way to limit the scope of the invention. Throughout the description, like reference numerals will refer to like elements in the respective figures.

Generally, an asset detection and management system in accordance with the present invention includes one or more asset detection systems and one or more asset repositories. An asset detection system and asset repository in accordance with the present invention each has an interface for exchanging information.

Figure 2:
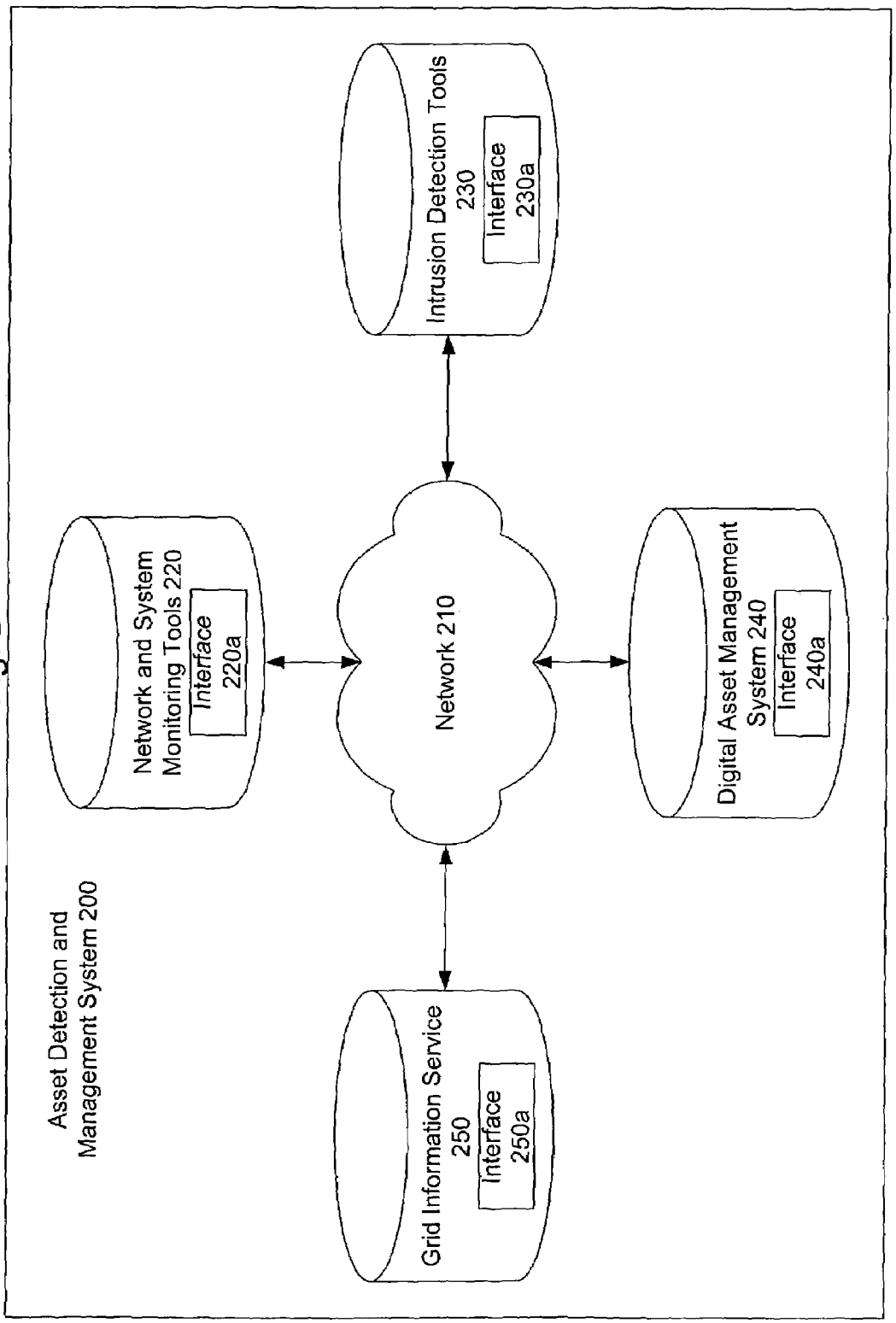
FIG. 2 is a block diagram of an exemplary system for asset detection and management in accordance with the present invention.

A block diagram of an exemplary system for asset detection and management in accordance with the present invention is shown in FIG. 2. As shown, asset detection and management system 200 includes multiple systems 220–250 connected to network 220. Network 220 may be a wide area network (WAN) such as, for example, the Internet, or a local area network (LAN) such as, for example a local network administered by an enterprise. Network 220 may also be a system such as, for example, a database management system (DBMS). Multiple systems 220–250 include network and system monitoring tools 220, intrusion detection tools 230, digital asset management (DAM) system 240, and grid information service (GIS) 250. Network and system monitoring tools 220 and intrusion detection tools 230 are examples of asset detection systems. DAM 240 and GIS 250 are examples of asset repositories. As should be appreciated, asset detection and monitoring system 200 may include any number of additional systems (not shown). Interfaces 220a–250a are applications running at systems 220–250 for exchanging information. Interfaces 220a–230a are examples of asset detection interfaces. Interfaces 240a–250a are examples of asset repository interfaces.

Such interfaces 220a–250a enable asset detection and management system 200 to perform tasks such as, for example, administration of network assets and verification of asset registration information. Flowcharts of exemplary methods for administration of network assets at asset detection systems 220 and 230 in accordance with the present invention are discussed in detail below with reference to FIGS. 3 and 4. Flowcharts of exemplary methods for verifying asset registration information at asset repositories 240 and 250 in accordance with the present invention are discussed in detail below with reference to FIGS. 5 and 6.

Figure 3:
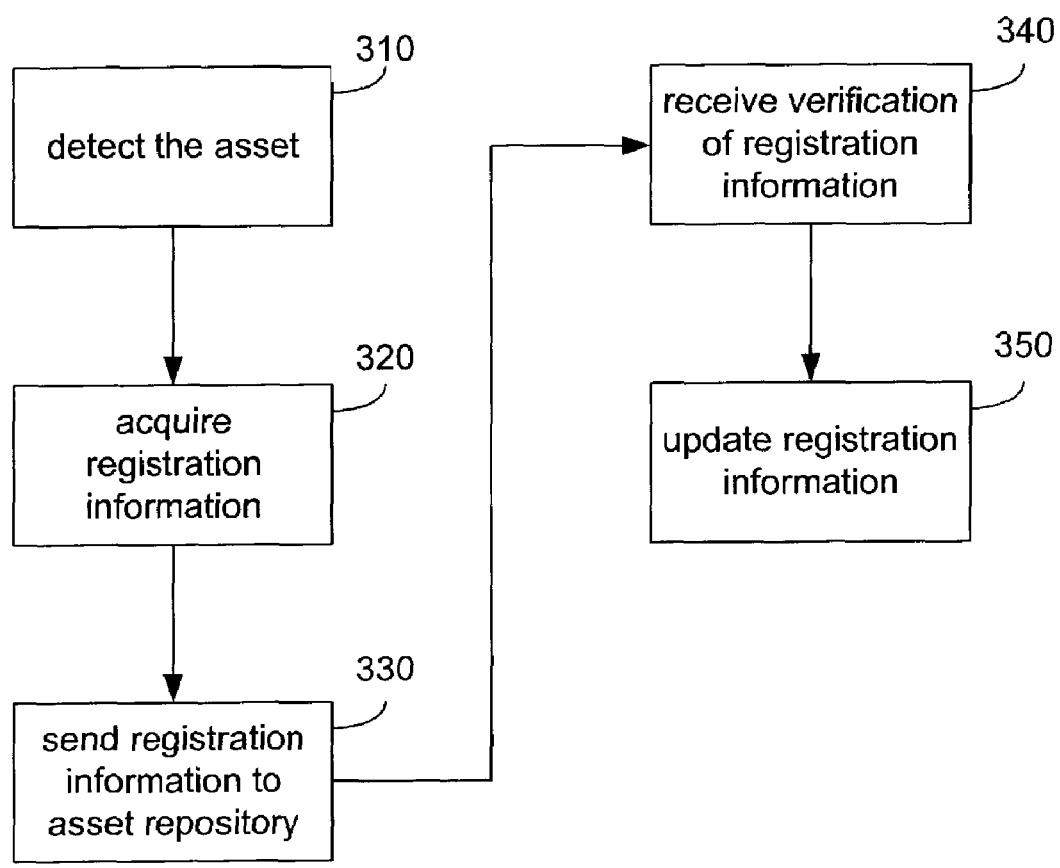
FIG. 3 is a flowchart of an exemplary method for administration of network assets at a network monitoring tool in accordance with the present invention.
Figure 4:
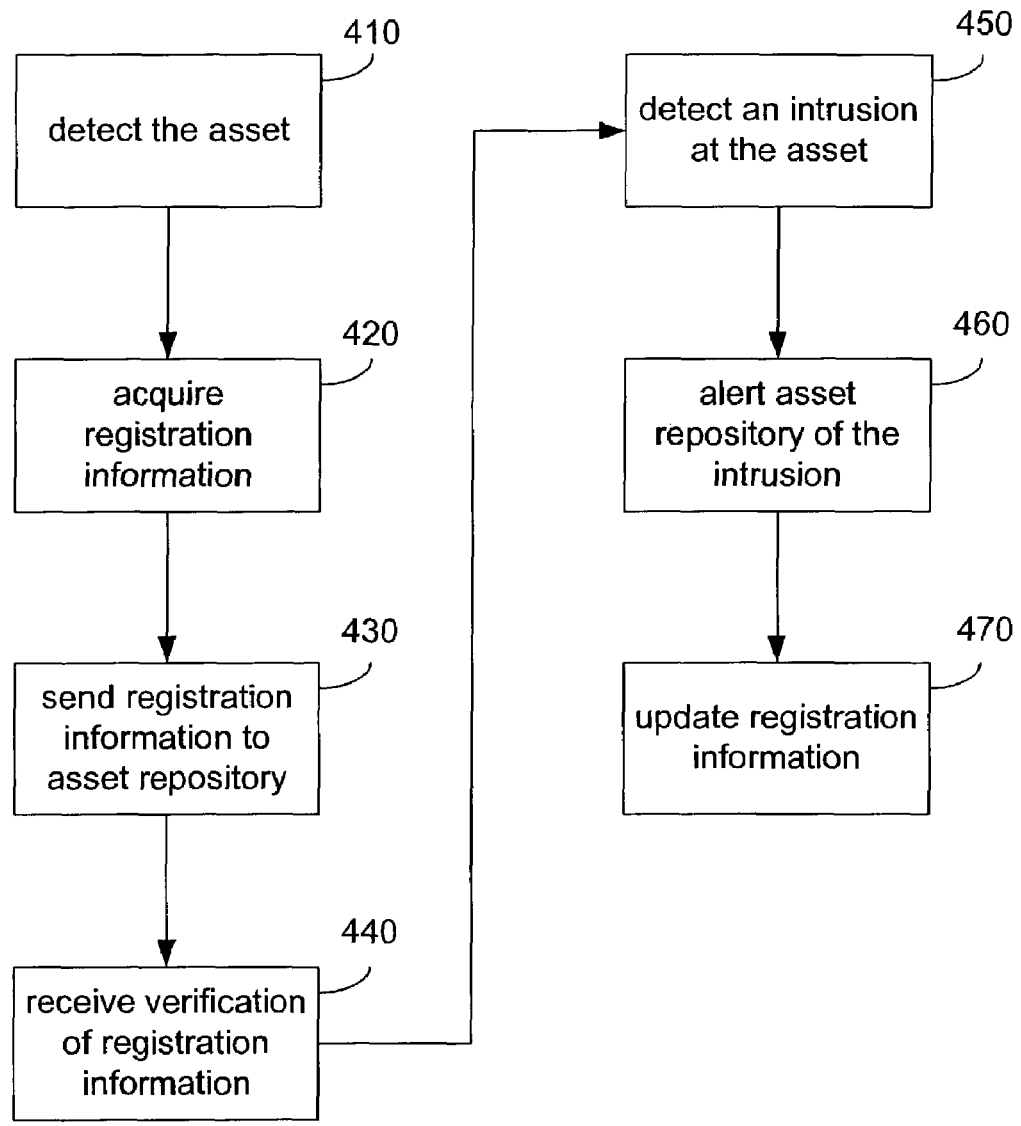
FIG. 4 is a flowchart of an exemplary method for administration of network assets at an intrusion detection tool in accordance with the present invention.

Flowcharts of exemplary methods for administration of network assets at asset detection systems 220 and 230 in accordance with the present invention are shown in FIGS. 3 and 4. In the exemplary method of FIG. 3, the asset detection system is network and system monitoring tools 220, while, in the exemplary method of FIG. 4, the asset detection system is intrusion detection tools 230. Generally, the appearance of an asset is detected and asset registration information is automatically acquired and sent to asset repositories 240 and 250. Such automatic acquisition and transfer of asset registration information enables assets to be automatically rather than manually registered at asset repositories 240 and 250. A verification of the registration information may be received from asset repositories 240 and 250. Asset registration information may also be updated. If the asset detection system is intrusion detection tools 230, an intrusion may be detected at the asset and an alert may be sent to asset repositories 240 and 250.

As shown in FIG. 3, at step 310, network and system monitoring tools 220 detect the appearance of an asset on network 210. For example, network sniffers may be used to detect soft assets. Such sniffers may detect digital signatures correlated to a digital certificate issued to licensed software applications.

At step 320, network and system monitoring tools 220 automatically acquire registration information for the detected asset. For a hard asset, such registration information generally includes information such as a number of central processing units (CPU's) operating at the asset or an amount of memory available at the asset. For a soft asset, such registration information may include information such as licensing information and information about the device on which the soft asset is deployed. A unique identifier such as, for example, an integer or a string may also be assigned to the asset.

At step 330, network and system monitoring tools interface 220a running at network and system monitoring tools 220 sends asset registration information to asset repository interfaces 240a and 250a running at asset repositories 240 and 250. Once it is received at asset repositories 240 and 250, such asset registration information may be verified at asset repositories 240 and 250. Asset registration information may also be recorded at asset repositories 240 and 250. Exemplary methods for verification of asset registration information are discussed in detail below with reference to FIGS. 5 and 6.

At step 340, network and system monitoring tools interface 220a may receive from asset repository interfaces 240a and 250a a verification of the asset registration information sent at step 330. Such a verification may be, for example, a message that the asset registration information has not been previously sent to asset repositories 240 and 250. Such a verification may also be, for example, a confirmation message that the asset registration information matches registration information for the asset that has been previously sent to asset repositories 240 and 250. Such a verification may also be, for example, an error message that the asset registration information does not match registration information for the asset that has been previously sent to asset repositories 240 and 250. Such an error message may identify the particular portions of the asset registration information that do not match.

If such an error message is received, network and system monitoring tools 220 may generate an alert that prompts a user or system administrator to confirm that the registration information for the asset has changed or to correct the new registration information.

At step 350, asset registration information may be updated by reacquiring asset registration information from the asset at network and system monitoring tools 220. Asset registration information may be updated periodically at a pre-determined interval. Asset registration information may also be automatically updated each time the asset is used or manually updated in response to a command from a user or system administrator. Updated registration information may be sent to asset repositories 240 and 250 for verification.

As shown in FIG. 4, at step 410, intrusion detection tools 230 detect the appearance of an asset on network 210.

At step 420, intrusion detection tools 230 automatically acquire registration information for the detected asset. For a hard asset, such registration information generally includes information such as a number of central processing units (CPU's) operating at the asset or an amount of memory available at the asset. For a soft asset, such registration information may include information such as licensing information and information about the device on which the soft asset is deployed. A unique identifier such as, for example, an integer or a string may also be assigned to the asset.

At step 430, intrusion detection tools interface 230a running at intrusion detection tools 230 sends asset registration information to asset repository interfaces 240a and 250a running at asset repositories 240 and 250. Once it is received at asset repositories 240 and 250, such asset registration information may be verified at asset repositories 240 and 250. Asset registration information may also be recorded at asset repositories 240 and 250. Exemplary methods for verification of asset registration information are discussed in detail below with reference to FIGS. 5 and 6.

At step 440, intrusion detection tools interface 230a may receive from asset repository interfaces 240a and 250a a verification of the asset registration information sent at step 330. Such a verification may be, for example, a message that the asset registration information has not been previously sent to asset repositories 240 and 250. Such a verification may also be, for example, a confirmation message that the asset registration information matches registration information for the asset that has been previously sent to asset repositories 240 and 250. Such a verification may also be, for example, an error message that the asset registration information does not match registration information for the asset that has been previously sent to asset repositories 240 and 250. Such an error message may identify the particular portions of the asset registration information that do not match.

If such an error message is received, intrusion detection tools 230 may generate an alert that prompts a user or system administrator to confirm that the registration information for the asset has changed or to correct the new registration information.

At step 450, intrusion detection tools 230 detect an intrusion at the asset. Such an intrusion may be, for example, a virus or an unauthorized login by a hacker.

At step 460, intrusion detection tools 230 alert asset repositories 240 and 250 of the intrusion. Such an alert may be an alert to suspend current running applications of the asset and/or an alert to suspend deployment of new applications to the asset. Intrusion detection tools 230 may also alert asset repositories 240 and 250 to configure and provision new applications in a manner such that new applications will not be affected by the intrusion at the asset.

At step 470, asset registration information may be updated by reacquiring asset registration information from the asset at intrusion detection tools 230. Asset registration information may be updated periodically at a pre-determined interval. Asset registration information may also be automatically updated each time the asset is used or manually updated in response to a command from a user or system administrator. Updated registration information may be sent to asset repositories 240 and 250 for verification.

Thus, exemplary methods for administration of network assets at an asset detection system in accordance with the present invention have been disclosed in FIGS. 3 and 4. The appearance of an asset is detected and asset registration information is automatically acquired and sent to asset repositories 240 and 250. Such automatic acquisition and transfer of asset registration information enables assets to be automatically rather than manually registered at asset repositories 240 and 250. A verification of the registration information may be received from asset repositories 240 and 250.

Asset registration information may also be updated. If the asset detection system is intrusion detection tools 230, an intrusion may be detected at the asset and an alert may be sent to asset repositories 240 and 250.

Figure 5:
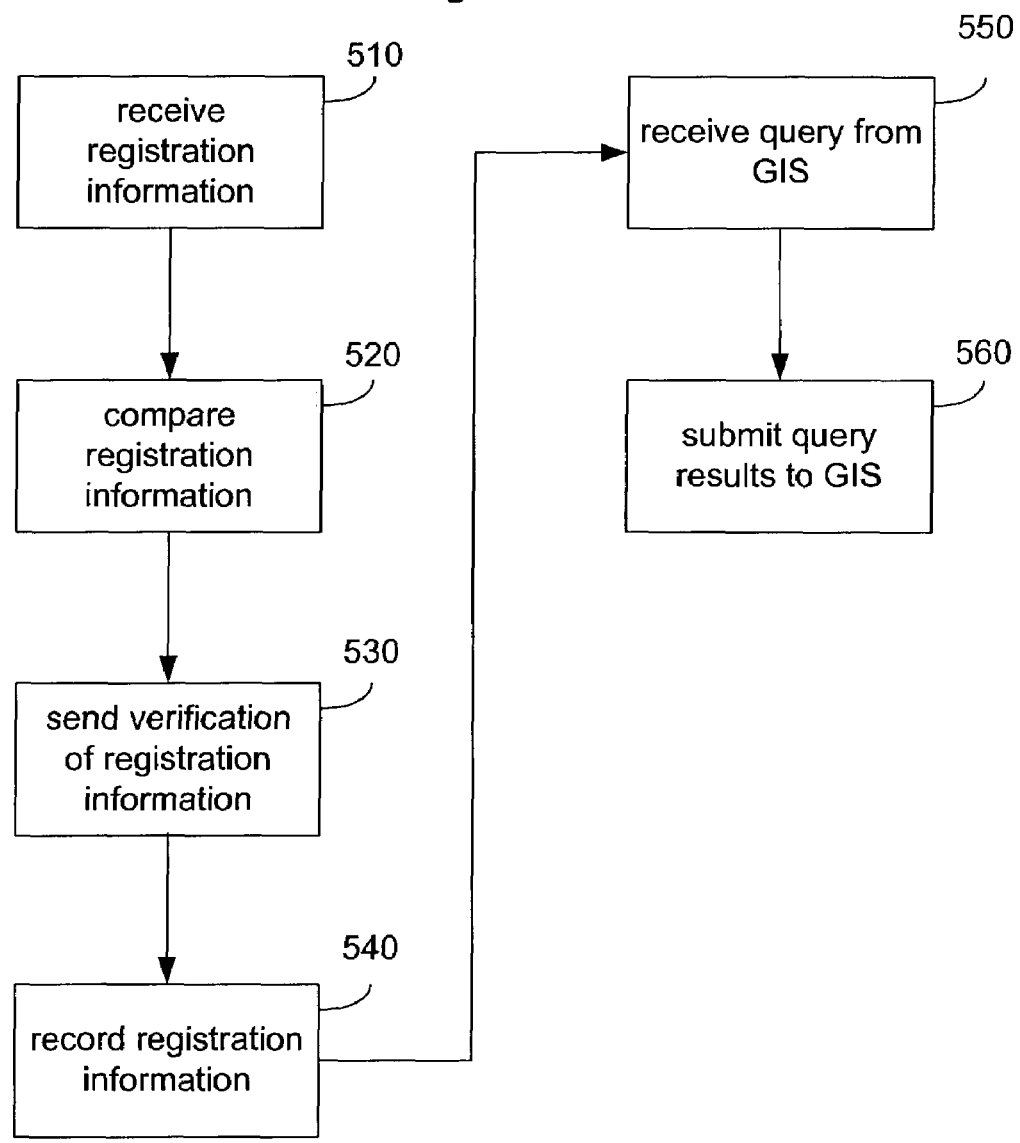
FIG. 5 is a flowchart of an exemplary method for verifying asset registration information at a DAM system in accordance with the present invention.

Exemplary flowcharts of methods for verification of asset registration information at an asset repository are shown in FIGS. 5 and 6. In the exemplary method of FIG. 5, the asset repository is DAM system 240, while, in the exemplary method of FIG. 6, the asset repository is GIS 250. Generally, asset registration information may be received from asset detection systems 220 and 230. The asset registration information may be verified against previously received registration information for the asset, and a verification may be sent to asset detection systems 220 and 230. The asset registration information may be recorded. If the asset repository is DAM system 240, a query may be received and query results may be submitted. If the asset repository is GIS 250, a request for a report may be received, a query may be executed, and a report may be generated.

As shown in FIG. 5, at step 510, asset registration information is received at DAM system interface 240a running at DAM system 240. For a hard asset, such registration information generally includes information such as a number of central processing units (CPU's) operating at the asset or an amount of memory available at the asset. For a soft asset, such registration information may include information such as licensing information and information about the device on which the soft asset is deployed. A unique identifier such as, for example, an integer or a string may also be assigned to the asset.

At step 520, DAM system 240 compares the asset registration information received at step 510 with previously received registration information for the asset. Previous registration information for the asset may not exist if the asset has not been previously registered.

At step 530, DAM system interface 240a sends to asset detection interfaces 220a and 230a a verification of the asset registration information received at step 510. Such a verification may be, for example, a message that the asset registration information has not been previously sent to asset repositories 240 and 250. Such a verification may also be, for example, a confirmation message that the asset registration information matches registration information for the asset that has been previously sent to asset repositories 240 and 250. Such a verification may also be, for example, an error message that the asset registration information does not match registration information for the asset that has been previously sent to asset repositories 240 and 250. Such an error message may identify the particular portions of the asset registration information that do not match.

If such an error message is sent, asset detection systems 220–230 may receive a command from a user or system administrator confirming that the registration information for the asset has changed or that the new registration information will be corrected.

At step 540, DAM system 240 records the verified registration information. For example, DAM system 240 may store information associated with digital licenses for soft assets.

At step 550, DAM system interface 240a receives a query from GIS 250. Such a query may be used to generate a report at GIS 250. Such a query may be, for example, a query to determine a number of available licenses for a particular software application. At step 560, DAM system interface 240a submits query results to GIS 250.

As shown in FIG. 6, at step 610, asset registration information is received at GIS interface 250a running at GIS 250. For a hard asset, such registration information generally includes information such as a number of central processing units (CPU's) operating at the asset or an amount of memory available at the asset. For a soft asset, such registration information may include information such as licensing information and information about the device on which the soft asset is deployed. A unique identifier such as, for example, an integer or a string may also be assigned to the asset.

At step 620, GIS 250 compares the asset registration information received at step 510 with previously received registration information for the asset. Previous registration information for the asset may not exist if the asset has not been previously registered.

At step 630, GIS interface 250a sends to asset detection interfaces 220a and 230a a verification of the asset registration information received at step 610. Such a verification may be, for example, a message that the asset registration information has not been previously sent to asset repositories 240 and 250. Such a verification may also be, for example, a confirmation message that the asset registration information matches registration information for the asset that has been previously sent to asset repositories 240 and 250. Such a verification may also be, for example, an error message that the asset registration information does not match registration information for the asset that has been previously sent to asset repositories 240 and 250. Such an error message may identify the particular portions of the asset registration information that do not match.

If such an error message is sent, asset detection systems 220–230 may receive a command from a user or system administrator confirming that the registration information for the asset has changed or that the new registration information will be corrected.

At step 640, GIS 250 records the verified registration information. Thus, GIS 250 may serve as an enterprise repository for assets, enabling information for hard and soft assets to be stored at a centralized database.

At step 650, GIS 250 receives a request for a report. Such a report may be, for example, a report regarding available licenses for a particular asset or group of assets. Such an asset or group of assets may be identified by, for example, the identifier of the assets or the identifier of the apparatus on which the assets are deployed. The report may be limited by parameters such as a requested period of time or a requested location.

At step 660, GIS 250 may query DAM system 240. For example, GIS 250 may query DAM system 240 for a number of available licenses for a particular asset recorded at DAM system 240. As should be appreciated, GIS 250 may also execute an internal query for data stored internally at GIS system 250. For example, GIS system 250 may execute an internal query to determine if a threshold at an asset is close to being exceeded.

At step 670, GIS 250 generates the requested report including the executed query results. Such a generated report may be stored at GIS 250 or mailed electronically to a requested electronic mail account.

Thus, exemplary flowcharts of methods for verification of asset registration information at an asset repository are shown in FIGS. 5 and 6. Asset registration information may be received from asset detection systems 220 and 230. The asset registration information may be verified against previously received registration information for the asset, and a verification may be sent to asset detection systems 220 and 230. The asset registration information may be recorded. If the asset repository is DAM system 240, a query may be received and query results may be submitted. If the asset repository is GIS 250, a request for a report may be received, a query may be executed, and a report may be generated.

Thus, a system and method for the detection and management of network assets has been disclosed. Such a system in accordance with the present invention includes one or more asset detection systems and one or more asset repositories. Asset detection systems and asset repositories in accordance with the present invention each have an interface for exchanging information. For example, such interfaces enable asset registration information to be detected at an asset detection system and automatically sent to an asset repository. Furthermore, for example, such interfaces enable asset registration information to be verified at an asset repository, and enable a verification to be sent to an asset detection system.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described above in connection with network and system monitoring tools 220 and intrusion detection tools 230 as examples of asset detection systems, it should be appreciated that any asset detection system may be used in connection with the present invention. Furthermore, for example, while the present invention is described above in connection with DAM system 240 and GIS system 250 as examples of asset repositories, it should be appreciated that any asset repository may be used in connection with the present invention. Therefore, the present invention should not be limited to any single embodiment, but rather should be construed in breadth and scope in accordance with the appended claims.

The invention claimed is:

1. A method for administration of network assets, the method comprising:
   detecting, by one of asset detection systems, an appearance of an asset in a network;
   acquiring, by the one of the asset detection systems, registration information associated with the detected asset;
   sending, by one of asset detection interfaces associated with the one of the asset detection systems, the acquired registration information to asset repositories; and
   receiving, by asset repository interfaces that run at the asset repositories, the acquired registration information corresponding to the detected asset from the one of the asset detection interfaces,
   wherein one of the asset repositories:
      compares the acquired registration information with previously received registration information associated with the detected asset;
      sends a message to the asset detection interfaces from one of the asset repository interfaces confirming the acquired registration information if the acquired registration information matches the previously received registration information stored at the asset repositories; and
      sends an alert to the asset detection interfaces from the one of the asset repository interfaces if the acquired registration information does not match the previously received registration information recorded at the asset repositories; and wherein the acquired registration information is updated by reacquiring asset registration information from the one of the asset detection systems.

2. The method of claim 1, wherein detecting the appearance of an asset comprises detecting the appearance of an asset via an intrusion detection tool on the network.

3. The method of claim 2, further comprising:
   detecting an intrusion of the detected asset; and
   alerting the asset repositories of the intrusion.

4. The method of claim 3, wherein alerting the asset repositories of the intrusion comprises:
   alerting an information service to suspend currently running applications of the detected asset; and
   alerting the information service to suspend deployment of new applications to the detected asset.

5. The method of claim 1, wherein detecting the appearance of an asset comprises detecting the appearance of a hardware apparatus.

6. The method of claim 5, wherein acquiring the registration information comprises acquiring a number of central processing units operating at the hardware apparatus.

7. The method of claim 5, wherein acquiring the registration information comprises acquiring an amount of memory available at the hardware apparatus.

8. The method of claim 1, wherein detecting the appearance of an asset comprises detecting the appearance of a software application.

9. The method of claim 8, wherein acquiring the registration information comprises acquiring registration information from a signature issued to an instance of the software application.

10. The method of claim 8, wherein acquiring the registration information comprises acquiring an identifier for a hardware apparatus on which the software application is deployed.

11. The method of claim 1, wherein reacquiring the registration information comprises acquiring an identifier for the detected asset.

12. The method of claim 1, wherein acquiring the registration information comprises acquiring an electronic license to use the detected asset.

13. The method of claim 1, further comprising:
   receiving from the one of the asset repositories a message that the acquired registration information has not been previously reported to an information service.

14. The method of claim 1, further comprising acquiring updated registration information at a pre-determined interval from the detected asset.

15. The method of claim 14, further comprising reporting the updated registration information to the asset repositories.

16. A system for detection and management of network assets, the system comprising:
   asset detection systems, wherein one of the asset detection systems detects an appearance of an asset of the network assets in a network and acquires registration information associated with the detected asset;
   asset detection interfaces, running at the asset detection systems, wherein one of the asset detection interfaces associated with the one of the asset detection systems sends the acquired registration information to asset repositories;
   asset repository interfaces that, running at the asset repositories, receive the acquired registration information corresponding to the detected asset from the one of the asset detection interfaces,
   wherein one of the asset repositories:

compares the acquired registration information with previously received registration information associated with the detected asset;

sends a message to the asset detection interfaces from one of the asset repository interfaces confirming the acquired registration information if the acquired registration information matches the previously received registration information stored at the asset repositories; and sends an alert to the asset detection interfaces from the one of the asset repository interfaces if the acquired registration information does not match the previously received registration information recorded at the asset repositories, and wherein the acquired registration information is updated by reacquiring asset registration information from the one of the asset detection systems.

17. The system of claim 16, wherein the asset detection systems comprise a network monitoring tool on the network.

18. The system of claim 16, wherein the asset detection systems comprise intrusion detection tool on the network.

19. The system of claim 16, wherein the asset repositories comprise a grid information service.

20. The system of claim 16, wherein the asset repositories comprise a digital asset management system.

\* \* \* \* \*